United States Patent
Al-Ghenaim et al.

(10) Patent No.: US 12,422,578 B2
(45) Date of Patent: Sep. 23, 2025

(54) CORRELATION OF GROUND VISCOSITY AND STIFFNESS MEASUREMENTS WITH TERRAIN CONDITIONS

(71) Applicant: Saudi Arabian Oil Company, Dhahran (SA)

(72) Inventors: Rashed Mohammed Al-Ghenaim, Dammam (SA); Naif Mohammad Alassaf, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 421 days.

(21) Appl. No.: 17/895,389

(22) Filed: Aug. 25, 2022

(65) Prior Publication Data

US 2024/0069224 A1    Feb. 29, 2024

(51) Int. Cl.
*G01V 1/00* (2024.01)
*G01V 1/28* (2006.01)

(52) U.S. Cl.
CPC ............... *G01V 1/003* (2013.01); *G01V 1/28* (2013.01)

(58) Field of Classification Search
None
See application file for complete search history.

(56) References Cited

U.S. PATENT DOCUMENTS

| | | | |
|---|---|---|---|
| 2013/0283923 A1* | 10/2013 | Eick | G01V 1/306 73/783 |
| 2015/0117150 A1* | 4/2015 | Bagaini | G01V 1/04 367/37 |

OTHER PUBLICATIONS

Al-Ali et al., "Vibrator attribute leading velocity estimation," The Leading Edge, 2003, 22:400-405, 5 pages.
Alassaf et al., "Correlation of ground viscosity and stiffness measurements with terrain conditions," IPTC-22640 presentation, presented at the International Petroleum Technology Conference, Feb. 23, 2022, 13 pages.
Ley et al., "Ground viscosity and stiffness measurement for near-surface seismic velocity," Geophysical Prospecting, 2006, 54:751-762, 12 pages.
Ras et al., "Ground Viscosity and Stiffness Measurements Using Different Vibrator Control Systems," EAGE Fall Research Workshop on Advances in Seismic Acquisition Technology, Sep. 2004, Rhodes, Greece, 4 pages.

* cited by examiner

*Primary Examiner* — Matthew G Marini
(74) *Attorney, Agent, or Firm* — Fish & Richardson P.C.

(57) ABSTRACT

Example computer-implemented methods, media, and systems for correlation of ground viscosity and stiffness measurements with terrain conditions are disclosed. One example computer-implemented method includes generating a respective ratio of measured ground stiffness to measured ground viscosity at each of multiple ground points, where each of the plurality of ground points is a point where vibrations are generated in ground for seismic data acquisition, and the measured ground stiffness and the measured ground viscosity at each of the plurality of ground points are obtained from a vibroseis system. A terrain classification code map is generated, where the terrain classification code map includes a respective terrain type for each of the plurality of ground points. The terrain classification code map is refined using the respective ratio of measured ground stiffness to measured ground viscosity at each of the multiple ground points.

17 Claims, 24 Drawing Sheets

Macros  Configure  Window  Help

S-85_2021_05_08330200001_3D_0......  X

| | | | | |
|---|---|---|---|---|
| H26 4 | Point index | 26-26 | %1d | 1 to 9 |
| H26 5 | Vibrator fleet number | 27-27 | %1d | Free |
| H26 6 | Vibrator number | 28-29 | %2d | Free |
| H26 7 | Vibrator drive level | 30-32 | %3d | 0 to 100 |
| H26 8 | Average phase | 33-36 | %4d | -180 to 180 |
| H26 9 | Peak phase | 37-40 | %4d | -180 to 180 |
| H26 10 | Average distortion | 41-42 | %2d | 0 to 99 |
| H26 11 | Peak distortion | 43-44 | %2d | 0 to 99 |
| H26 12 | Average force | 45-46 | %2d | 0 to 99 |
| H26 13 | Peak force | 47-49 | %3d | Free |
| H26 14 | Average ground stiffnees | 50-52 | %3d | Free |
| H26 15 | Average ground Viscosity | 53-55 | %3d | Free |
| H26 16 | Vib. position easting | 56-64 | %9.1f | Free |
| H26 17 | Vib. position northing | 65-74 | %10.1f | Free |
| H26 18 | Vib. position elevation | 75-80 | %6.1f | -999.9 to 9999.9 |
| H26 19 | Shot number | 82-86 | %5d | 1 or 99999 |
| H26 20 | Acquisition number | 87-86 | %2d | 1 to 32 |
| H26 21 | 2-digit vibrator fleet number | 89-90 | %2d | 1 to 32 |
| H26 22 | Vib status code | 91-92 | %2d | 1 to 98 |
| H26 23 | Mass 1 Warning | 94-94 | %1d | or W |

FIG. 4

| | GS | GV | Easting | Northing | Elevation | | | |
|---|---|---|---|---|---|---|---|---|
| A | 18417.0 | 68005.013 | 8 | 75 | 3 | 12235370 | 79 | 38 | 15 | 1 | 1 | 3 | 3 |
| A | 18417.0 | 68005.013 | 9 | 75 | 3 | 14256065 | 76 | 37 | 17 | 1 | 1 | 3 | 3 |
| A | 18417.0 | 68017.013 | 8 | 75 | 2 | 9287271 | 79 | 37 | 20 | 2 | 1 | 3 | 3 |
| A | 18417.0 | 68017.013 | 9 | 75 | 3 | 14267667 | 76 | 34 | 18 | 2 | 1 | 3 | 3 |
| A | 18417.0 | 68029.013 | 8 | 75 | 2 | 8132773 | 79 | 53 | 20 | 3 | 1 | 3 | 3 |
| A | 18417.0 | 68029.013 | 9 | 75 | 1 | 7132174 | 77 | 55 | 22 | 3 | 1 | 3 | 3 |
| A | 18417.0 | 68041.013 | 8 | 75 | 2 | 9132373 | 79 | 52 | 20 | 4 | 1 | 3 | 3 |
| A | 18417.0 | 68041.013 | 9 | 75 | 1 | 6121974 | 79 | 53 | 22 | 4 | 1 | 3 | 3 |
| A | 18417.0 | 68053.013 | 8 | 75 | 2 | 10184368 | 79 | 45 | 17 | 5 | 1 | 3 | 3 |
| A | 18417.0 | 68053.013 | 9 | 75 | 3 | 17269968 | 76 | 41 | 17 | 5 | 1 | 3 | 3 |
| A | 18417.0 | 68065.013 | 8 | 75 | 2 | 6256167 | 79 | 35 | 19 | 6 | 1 | 3 | 3 |
| A | 18417.0 | 68065.013 | 9 | 75 | 2 | 12255466 | 76 | 35 | 18 | 6 | 1 | 3 | 3 |
| A | 18417.0 | 68077.013 | 8 | 75 | 2 | -14257369 | 79 | 39 | 44 | 7 | 1 | 3 | 3 |
| A | 18417.0 | 68077.013 | 9 | 75 | 3 | 8258968 | 76 | 42 | 17 | 7 | 1 | 3 | 3 |
| A | 18417.0 | 68089.013 | 8 | 75 | 2 | 9132673 | 79 | 52 | 15 | 8 | 1 | 3 | 3 |

Data Mining App

File

Root Folder Path: D\Field_Operations\00_CREWS\S-77\12-ROC\10_Daily System Files\2019\05_May\*\.VAPS|

UTM Zone
390Q

Add variable

Number of Header lines: 53

| Variable Name | Start Column # | End Column # |
|---|---|---|
| Average ground stiffness | 50 | 52 |
| Average ground viscosity | 53 | 55 |
| Vib. position easting | 56 | 64 |
| Vib. position northing | 65 | 74 |
| Vib. position elevation | 75 | 80 |

Easting: No Data ▷
Northing: No Data ▷
Attribute: No Data ▷

3D Globe Plot | Plot Coordinates | Density Plot Map | Satellite ▷

Extract

Save to Excel

FIG. 6

| A | B | C | D | E |
|---|---|---|---|---|
| Average ground stiffness | Average ground viscosity | Vib. position easting | Vib. position northing | Vib. position elevation |
| 25 | 30 | | | |
| 23 | 30 | | | |
| 40 | 29 | | | |
| 39 | 33 | | | |
| 34 | 23 | | | |
| 52 | 28 | | | |

FIG. 7

| | A | B | C | D | E | F |
|---|---|---|---|---|---|---|
| | Average ground stiffness | Average ground viscosity | Vib. position easting | Vib. position northing | Vib. position elevation | Gs/Gv |
| | 25 | 30 | | | | 0.833 |
| | 23 | 30 | | | | 0.767 |
| | 40 | 29 | | | | 1.379 |
| | 39 | 33 | | | | 1.182 |
| | 34 | 23 | | | | 1.478 |

FIG. 8

| Line, Station, IndexCd, Easting, Northing, elevation, ControlCode, SwathNumber, flag, Terrainclassificationcode |
|---|
| 44077, 42425, 3, SP, 2018, 3, 4, 1V3, |
| 44077, 42437, 3, SP, 2018, 0, 4, 1V3, |
| 44077, 42449, 3, SP, 2018, 0, 4, 1V3, |
| 44077, 42461, 3, SP, 2018, 0, 4, 1V3, |
| 44077, 42473, 3, SP, 2018, 0, 1, 1V3, |
| 44077, 42485, 3, SP, 2018, 0, 1, 1V3, |
| 44077, 42497, 3, SP, 2018, 0, 1, 1V3, |
| 44077, 42509, 3, SP, 2018, 0, 1, 1V3, |
| 44077, 42521, 3, SP, 2018, 0, 1, 1V3, |
| 44077, 42533, 3, SP, 2018, 0, 1, 1V3, |
| 44077, 42545, 3, SP, 2018, 0, 1, 1V3, P_ |
| 44077, 42557, 3, SP, 2018, 0, 1, 1V3, |
| 44077, 42569, 3, SP, 2018, 0, 1, 1V3, P_ |
| 44077, 42581, 3, SP, 2018, 0, 1, 1V3, |
| 44077, 42593, 3, SP, 2018, 0, 1, 1V3, |
| 44077, 42605, 3, SP, 2018, 0, 1, 1V3, |
| 44077, 42617, 3, SP, 2018, 0, 1, 1V3, |
| 44077, 42629, 3, SP, 2018, 0, 1, 1V3, |
| 44077, 42641, 3, SP, 2018, 0, 1, 1V3, |
| 44077, 42653, 3, SP, 2018, 0, 1, 1V3, |
| 44077, 42665, 3, SP, 2018, 0, 1, 1V3, |
| 44077, 42677, 3, SP, 2018, 0, 6, 1V3, |

FIG. 13

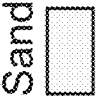 Sand
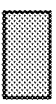 Gravel
 Dikakha
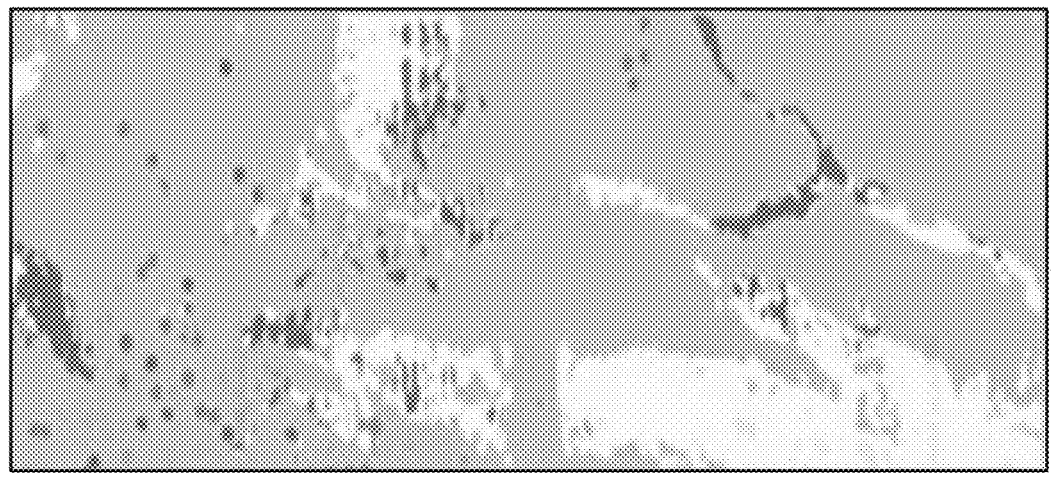
FIG. 14

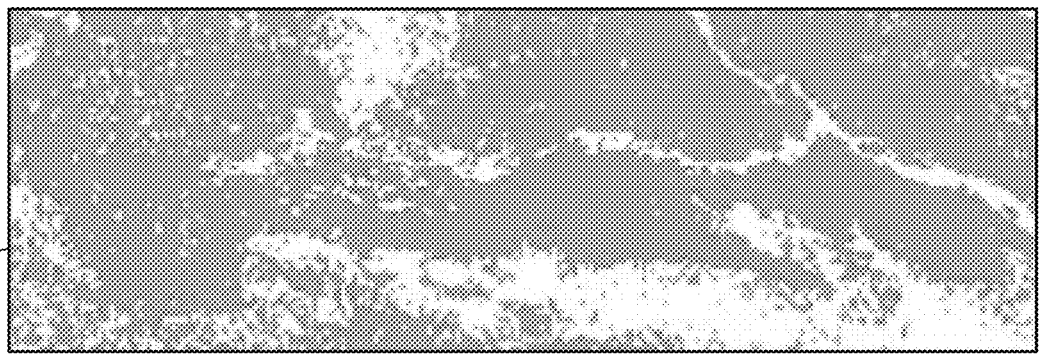
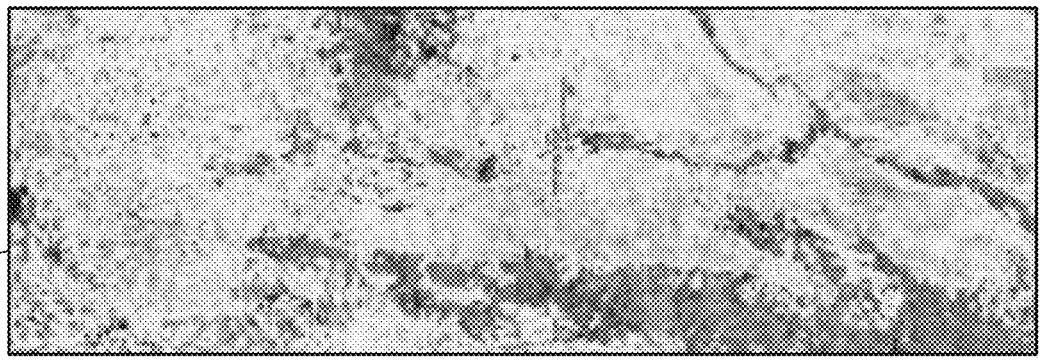
FIG. 17

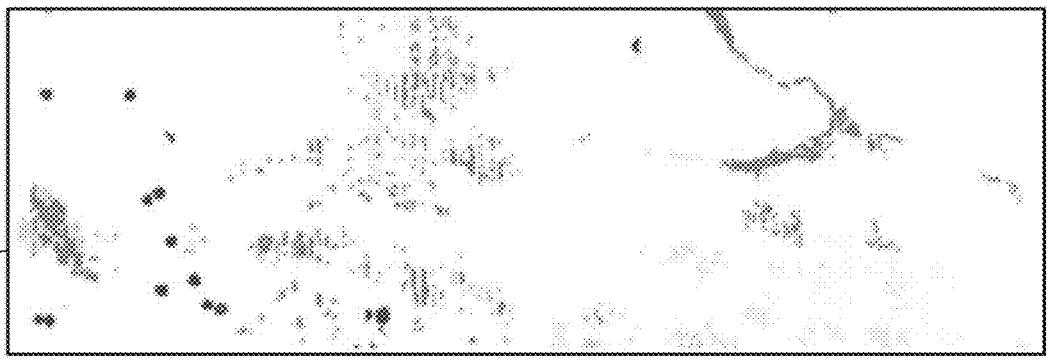
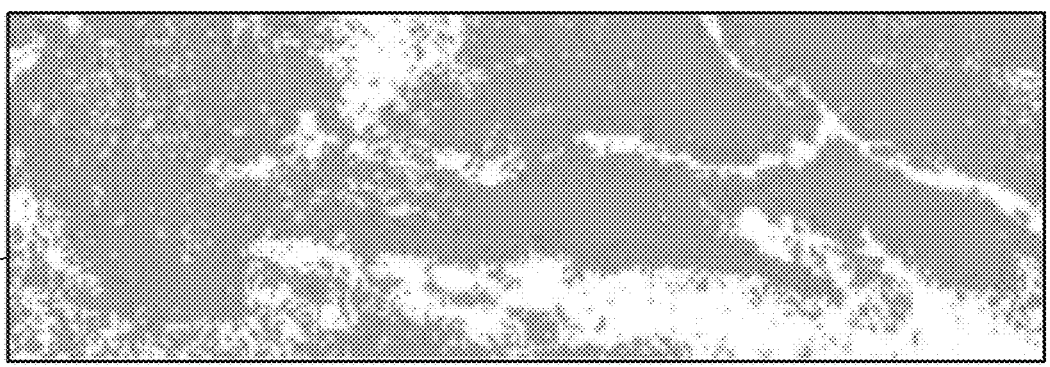
FIG. 21

2300

2302
Generate a Respective Ratio of Measured Ground Stiffness to Measured Ground Viscosity at Each of Multiple Ground Points, Where Each of the Multiple Ground Points is a Point Where Vibrations are Generated in Ground for Seismic Data Acquisition, and the Measured Ground Stiffness and the Measured Ground Viscosity at Each of the Multiple Ground Points are Obtained from a Vibroseis System

2304
Generate a Terrain Classification Code Map, Where the Terrain Classification Code Map Comprises a Respective Terrain Type for Each of the Multiple Ground Points

2306
Refine the Terrain Classification Code Map Using the Respective Ratio of Measured Ground Stiffness to Measured Ground Viscosity at Each of the Multiple Ground Points

FIG. 23

CORRELATION OF GROUND VISCOSITY AND STIFFNESS MEASUREMENTS WITH TERRAIN CONDITIONS

TECHNICAL FIELD

The present disclosure relates to computer-implemented methods, media, and systems for correlation of ground viscosity and stiffness measurements with terrain conditions.

BACKGROUND

Terrain conditions such as terrain types of ground points within a ground area can be represented using a terrain classification code map of the ground area. Some example terrain types include sand and gravel. In general terrain classification code map is manually acquired in the field and may include inaccurate representations of terrain types of some ground points in the ground area due to errors introduced during the process of manually acquiring the terrain classification code map in the field.

SUMMARY

The present disclosure involves computer-implemented methods, media, and systems for correlation of ground viscosity and stiffness measurements with terrain conditions. One example computer-implemented method includes generating a respective ratio of measured ground stiffness to measured ground viscosity at each of multiple ground points, where each of the plurality of ground points is a point where vibrations are generated in ground for seismic data acquisition, and the measured ground stiffness and the measured ground viscosity at each of the plurality of ground points are obtained from a vibroseis system. A terrain classification code map is generated, where the terrain classification code map includes a respective terrain type for each of the plurality of ground points. The terrain classification code map is refined using the respective ratio of measured ground stiffness to measured ground viscosity at each of the multiple ground points.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 4 illustrates an example interface showing information associated with viscosity, stiffness, and coordinate columns identified from vibroseis daily production files.

FIG. 5 illustrates an example of a file including the combined viscosity, stiffness, and coordinate columns.

FIG. 6 illustrates an example interface of a tool for combining viscosity, stiffness, and coordinate columns in multiple vibroseis daily production files.

FIG. 7 illustrates an example of a file with combined viscosity, stiffness, and coordinate data.

FIG. 8 illustrates an example of a file with calculated ratio of measured ground stiffness to measured ground viscosity at each ground point.

FIG. 13 illustrates an example of a file with extracted terrain classification codes and corresponding coordinates of the ground points.

FIG. 14 illustrates an example terrain classification code map.

FIG. 17 illustrates an example comparison between a stiffness to viscosity ratio map and a reclassified stiffness to viscosity ratio map.

FIG. 21 illustrates an example process for refining a terrain classification code map using a stiffness to viscosity ratio map.

FIG. 23 illustrates an example method for refining a terrain classification code map using a stiffness to viscosity ratio map.

Like reference numbers and designations in the various drawings indicate like elements.

DETAILED DESCRIPTION

While a terrain classification code map is manually acquired in the field, stiffness and viscosity values of a ground point can be measured mechanically from a vibroseis system at the ground point during seismic data acquisition. An example seismic data acquisition method is vibroseis, where a vibrator is used as an energy source to generate a controlled wavetrain through vibrations in the ground for the purpose of seismic data acquisition.

This disclosure describes technologies related to the correlation of ground viscosity and stiffness measurements with terrain conditions. In some implementations, a terrain classification code map representing terrain conditions such as terrain types of an area for seismic data acquisition can be refined based on the correlation between terrain classification codes of ground points in the area for seismic data acquisition and ground viscosity and stiffness measurements generated using vibroseis in the same area for seismic data acquisition. A stiffness to viscosity ratio map generated using the measured ground stiffness and measured ground viscosity from the vibroseis can indicate the changes in terrain conditions, and can be used to correct inaccurate terrain types in the terrain classification code map, thus refining the terrain classification code map.

Figure 1:
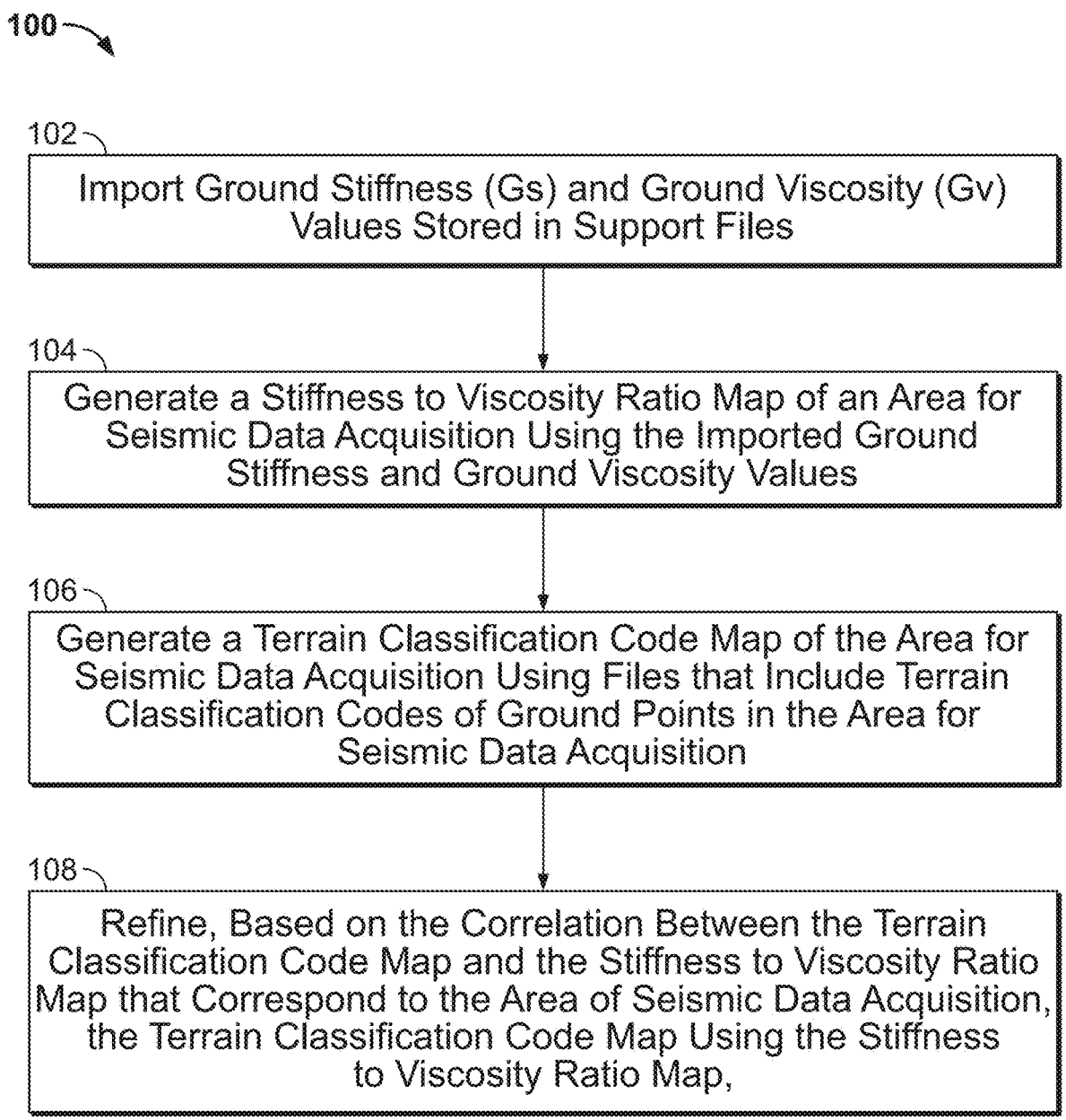
FIG. 1 is a flowchart illustrating an example workflow for refining a terrain classification code map using a stiffness to viscosity ratio map.

FIG. 1 is a flowchart 100 illustrating an example workflow for refining a terrain classification code map using a stiffness to viscosity ratio map.

Figure 2:
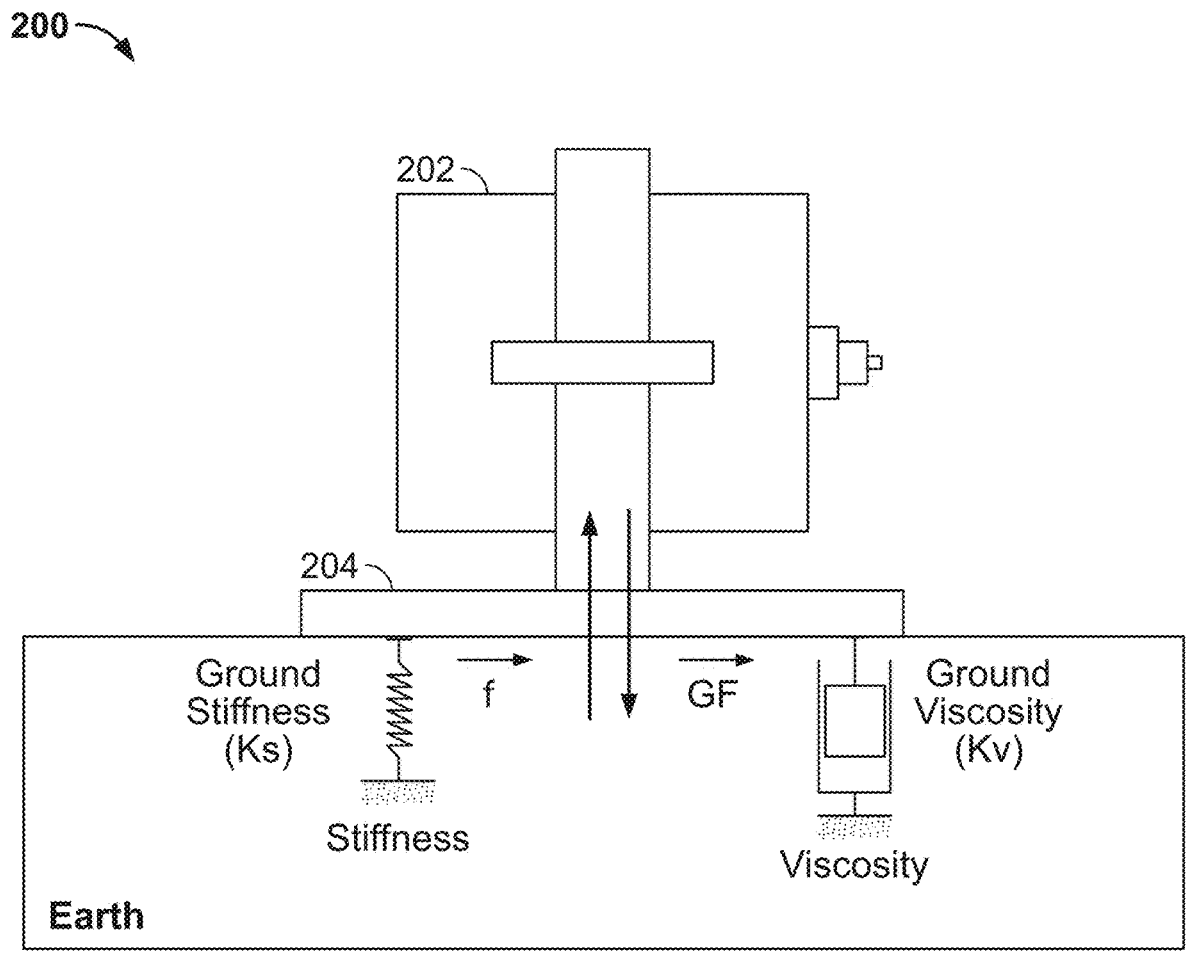
FIG. 2 illustrates an example schematic of a vibroseis system for measuring stiffness and viscosity at a ground point.

At 102, ground stiffness (Gs) and ground viscosity (Gv) values stored in support files are imported. The support files include vibroseis measurements of all shot points within an area for seismic data acquisition, with each shot point being a ground point where vibrations are generated in the ground for seismic data acquisition. An example schematic 200 of a vibroseis system for measuring stiffness and viscosity at a ground point is illustrated in FIG. 2 and described later.

Figure 11:
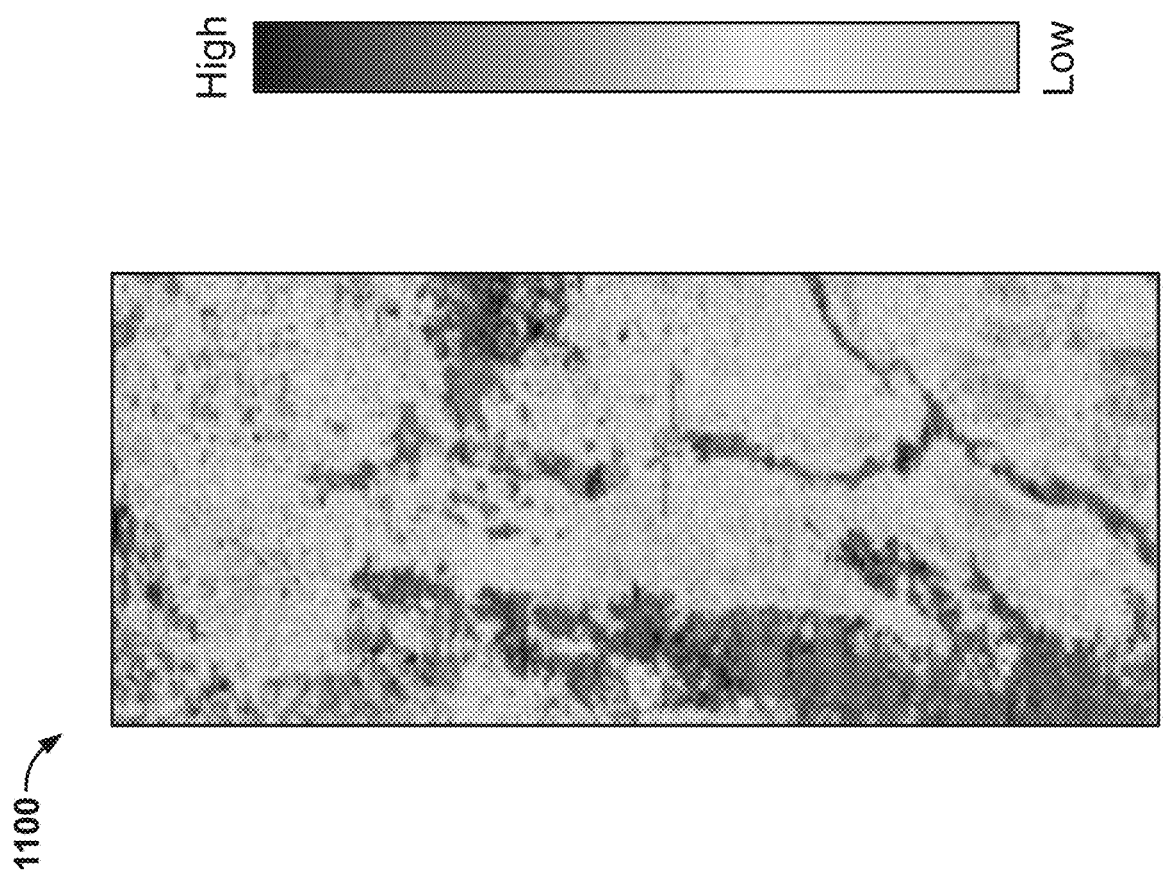
FIG. 11 illustrates an example of a stiffness to viscosity ratio map.

At 104, a stiffness to viscosity ratio map of the area for seismic data acquisition is generated. Ground stiffness and ground viscosity values imported at 102 are processed to calculate the ground stiffness to ground viscosity ratio at each of the shot points within the area for seismic data acquisition. The calculated ground stiffness to ground viscosity ratios are used together with the measured coordinates of all shot points to generate a stiffness to viscosity ratio map. An example stiffness to viscosity ratio map 1100 is illustrated in FIG. 11.

Figure 12:
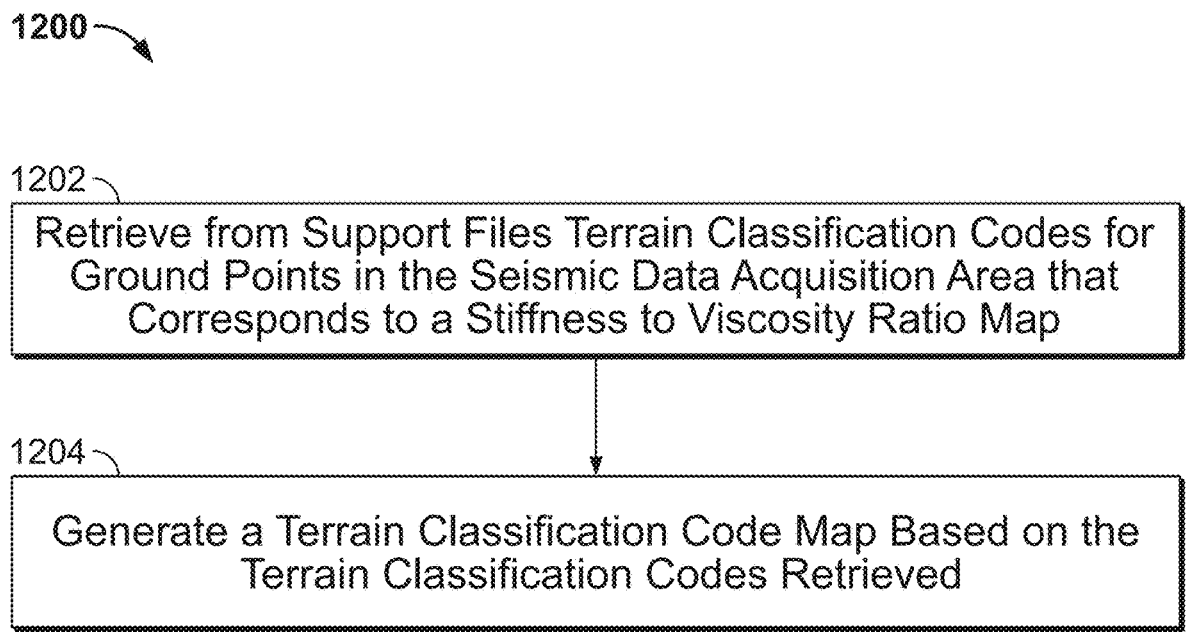
FIG. 12 illustrates an example process for generating a terrain classification code map.

At 106, a terrain classification code map of the area for seismic data acquisition is generated using files that include terrain classification codes of ground points in the area for seismic data acquisition. An example process 1200 for generating a terrain classification code map is illustrated in FIG. 12 and described later. An example terrain classification code map 1400 is illustrated in FIG. 14.

Figure 22:
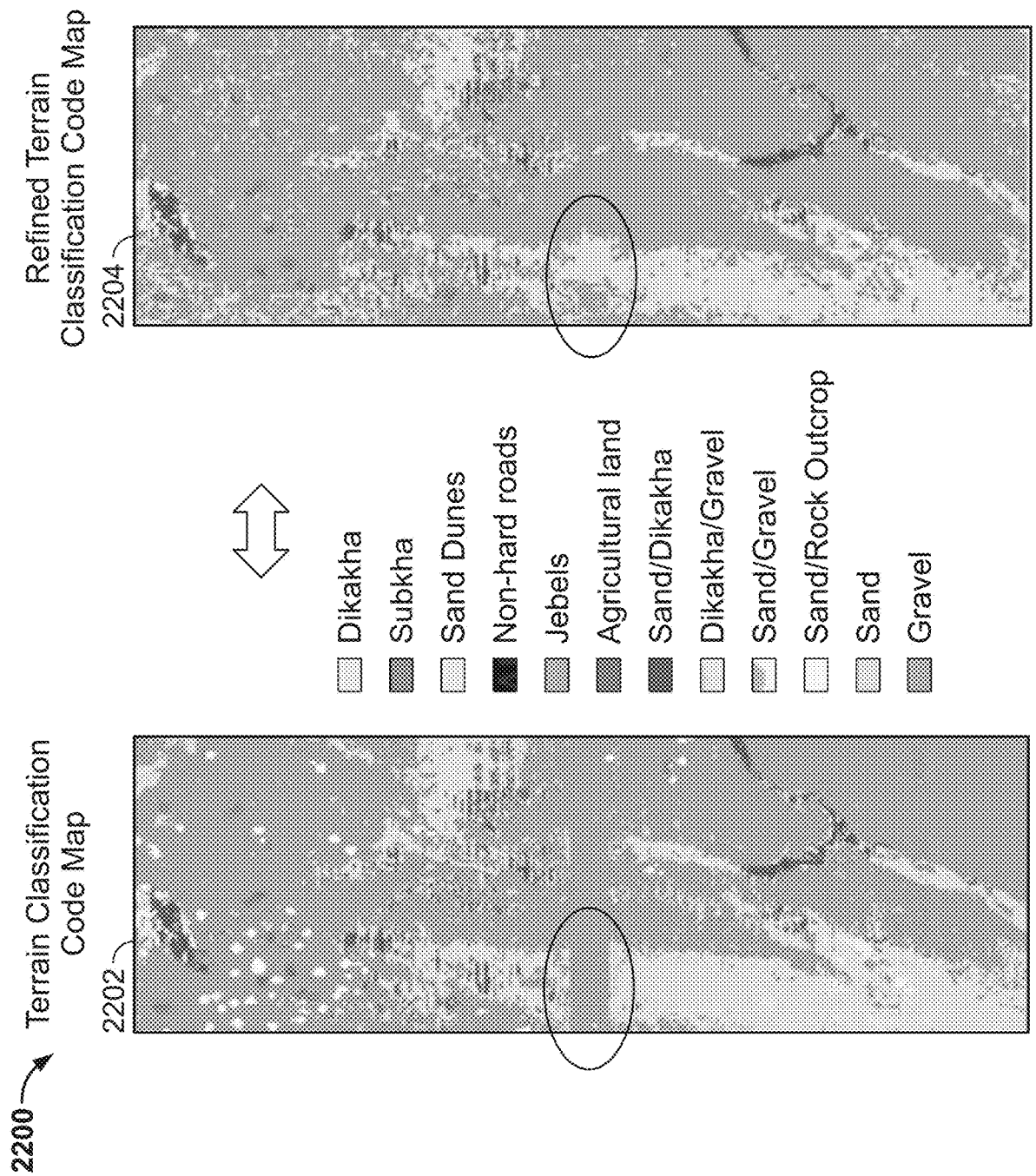
FIG. 22 illustrates an example of a refined terrain classification code map.

At 108, the terrain classification code map generated at 106 is refined using the stiffness to viscosity ratio map generated at 104, based on the correlation between the terrain classification code map and the stiffness to viscosity ratio map that correspond to the same area of seismic data acquisition. The terrain classification code map includes a terrain type, such as sand or gravel, for each ground point in the terrain classification code map. An example process 2100 for refining a terrain classification code map using a stiffness to viscosity ratio map is illustrated in FIG. 21 and described later. An example 2204 of a refined terrain classification code map is illustrated in FIG. 22.

FIG. 2 illustrates an example schematic 200 of a vibroseis system for measuring stiffness and viscosity at a ground point. The ground force (GF) is generated by a relative displacement of the mass and the base plate 204 of the vibrator 202. The earth response f to the ground force GF is a second-order system, depicted by the stiffness and viscosity at the ground point. The ground viscosity and stiffness can be calculated with a Kalman filter using a vibrator model and sweep acceleration measurements.

Figure 3:
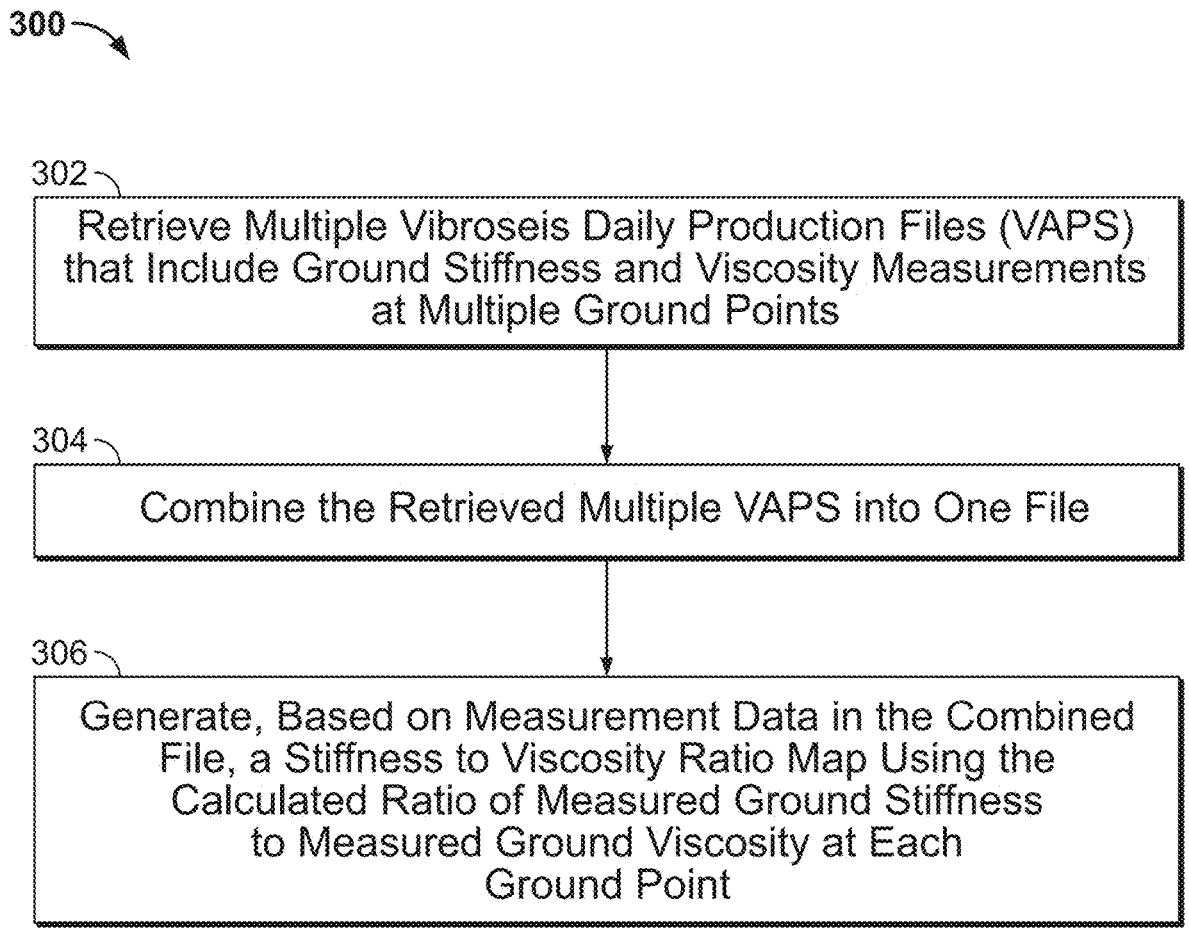
FIG. 3 illustrates an example process for generating a stiffness to viscosity ratio map.

FIG. 3 illustrates an example process 300 for generating a stiffness to viscosity ratio map for multiple ground points where seismic data are collected using a vibroseis system.

At 302, multiple vibroseis daily production files (VAPS) that include ground stiffness and viscosity measurements at multiple ground points are retrieved. The start and end dates of the seismic acquisition area corresponding to the multiple VAPS are identified. The retrieved multiple VAPS are downloaded into a folder. Viscosity, stiffness, and coordinate columns from the header of the VAPS are identified. The coordinate columns include location information of the ground points where seismic data are collected using a vibroseis system. An example interface 400 showing information associated with the identified viscosity, stiffness, and coordinate columns is illustrated in FIG. 4.

At 304, the retrieved multiple VAPS are combined into one file. Viscosity, stiffness, and coordinate columns in the retrieved multiple VAPS are combined into one file. An example 500 of a file including the combined viscosity, stiffness, and coordinate columns is illustrated in FIG. 5. The easting, northing, and elevation columns can be populated with location information to provide three-dimensional location information of the ground points. An example interface 600 of a tool for combining viscosity, stiffness, and coordinate columns is illustrated in FIG. 6. The file with combined viscosity, stiffness, and coordinate columns has measured ground viscosity, measured ground stiffness, and coordinates for each ground point where seismic data are collected. The combined viscosity, stiffness, and coordinates data in a sample file 700 is illustrated in FIG. 7. A ratio of measured ground stiffness to measured ground viscosity at each ground point can be calculated based on the file. The calculated ratio of measured ground stiffness to measured ground viscosity at each ground point in a sample file 800 is illustrated in FIG. 8. The easting, northing, and elevation columns in FIG. 7 and FIG. 8 can be populated with location information to provide three-dimensional location information of the ground points.

Figure 9:
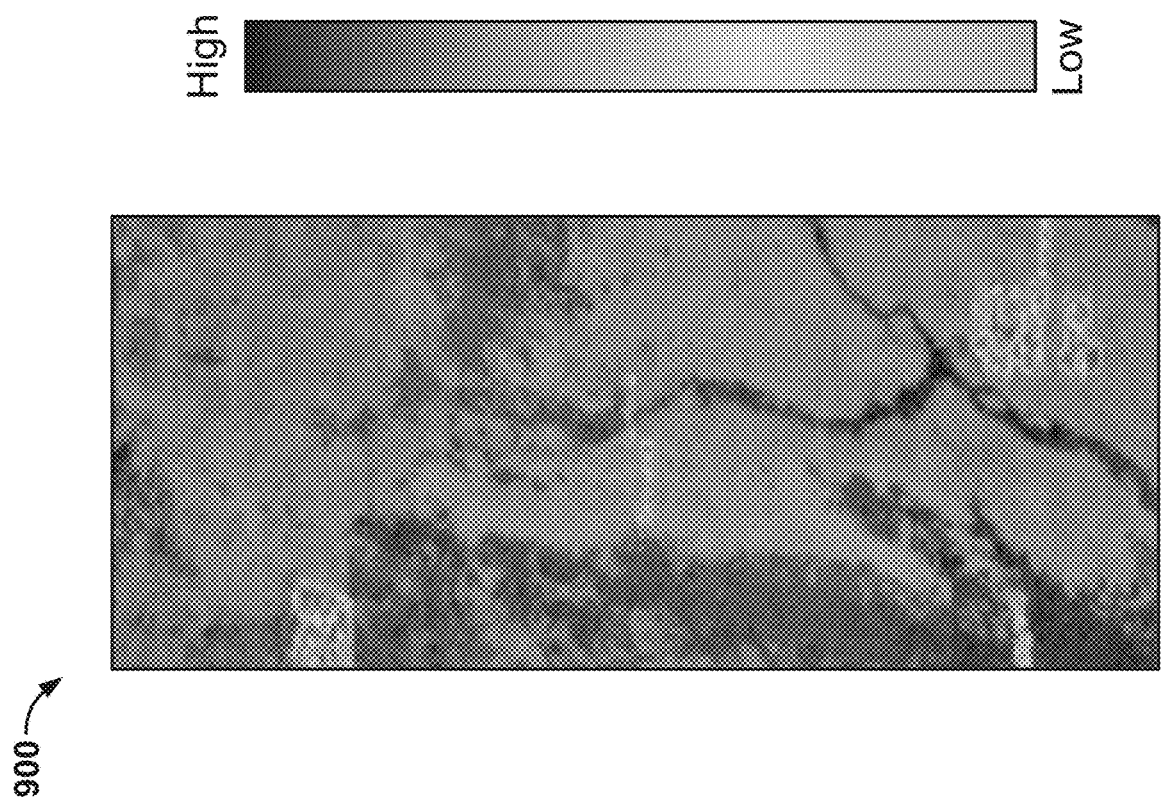
FIG. 9 illustrates an example of a stiffness map.
Figure 10:
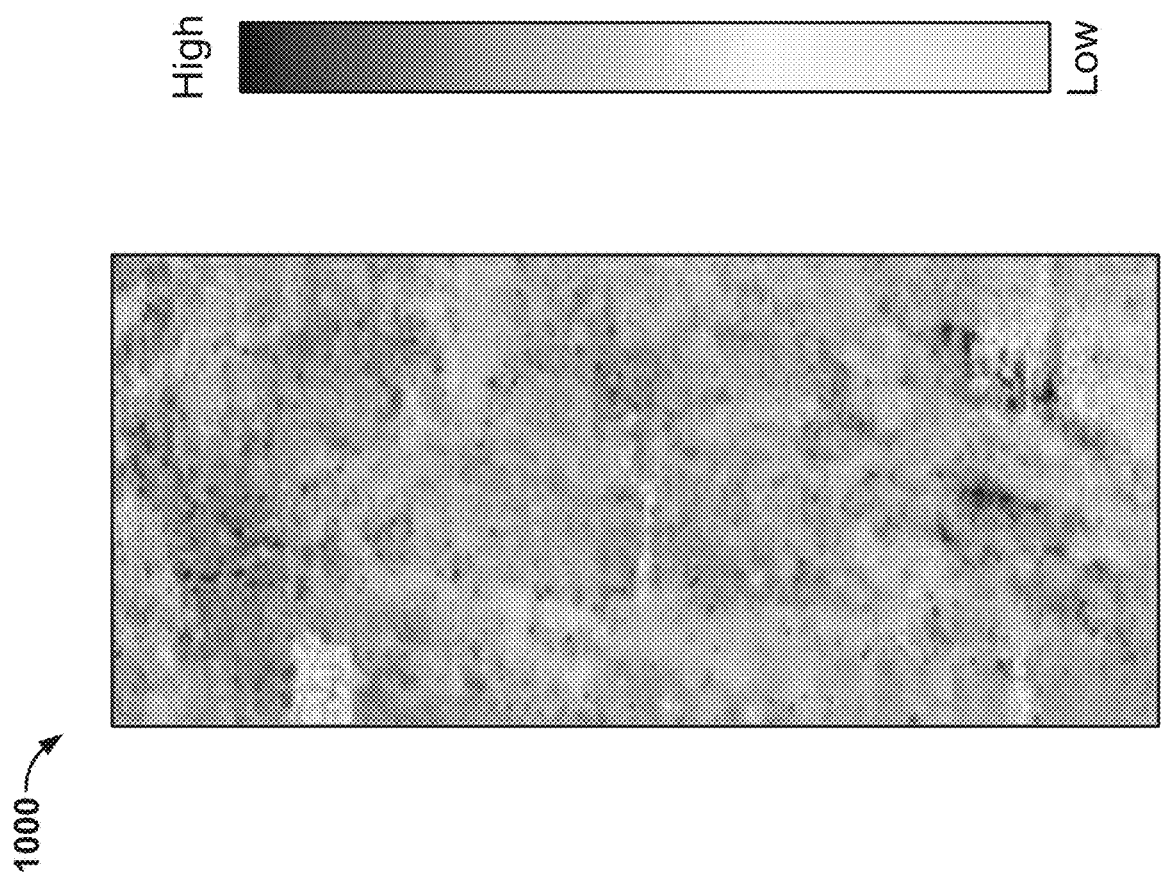
FIG. 10 illustrates an example of a viscosity map.

At 306, stiffness map, viscosity map, and stiffness to viscosity ratio map are generated using measured ground stiffness for each ground point, measured ground viscosity at each ground point, and the calculated ratio of measured ground stiffness to measured ground viscosity at each ground point, respectively. These maps can be generated using a geographic information system (GIS) service software, for example, ArcGIS", a GIS service software developed and maintained by Esri. FIG. 9 illustrates an example 900 of a stiffness map. FIG. 10 illustrates an example 1000 of a viscosity map. FIG. 11 illustrates an example 1100 of a stiffness to viscosity ratio map. All three example maps correspond to the same seismic data acquisition area.

FIG. 12 illustrates an example process 1200 for generating a terrain classification code map. The terrain classification code map can be generated for the same seismic data acquisition area that corresponds to the stiffness to viscosity ratio map generated using the example process 300 illustrated in FIG. 3.

At 1202, terrain classification codes for ground points in the seismic data acquisition area that corresponds to a stiffness to viscosity ratio map are retrieved from support files. If the terrain classification codes are in multiple files, for example, multiple weekly shipment terrain classification code files, the terrain classification codes in the multiple files are combined into a single file. Next the columns for the terrain classification codes in the combined file are extracted along with the coordinates of the ground points corresponding to the terrain classification codes. An example file 1300 showing the extracted terrain classification codes along with the corresponding coordinates of the ground points is illustrated in FIG. 13. The easting, northing, and elevation columns of FIG. 13 can be populated with location information to provide three-dimensional location information of the ground points.

At 1204, a terrain classification code map is generated based on the terrain classification codes retrieved at 1202. For example, the aggregate point tool of ArcGIS", a GIS service software, can be used for the generation of the terrain classification code map. An example 1400 of the generated terrain classification code map is illustrated in FIG. 14, where three terrain types, sand, gravel, and dikakha, are shown. Dikakha is a plant structure that may be found in the dune sands of arid deserts, and may be associated with low-lying swamp-like environments that have sporadic supply of water.

Figure 15:
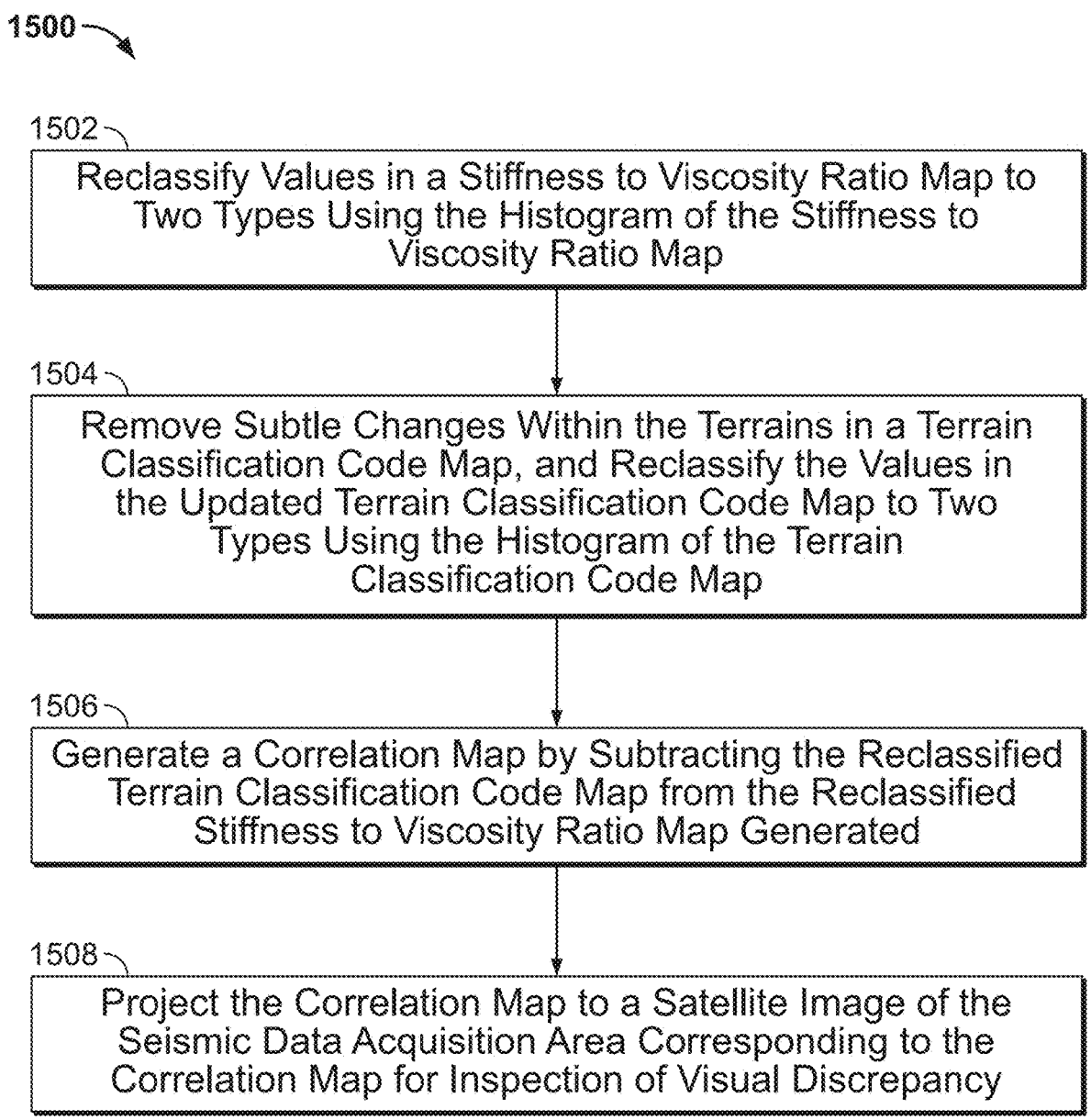
FIG. 15 illustrates an example process for generating a correlation map using a terrain classification code map and a stiffness to viscosity ratio map.

FIG. 15 illustrates an example process 1500 for generating a correlation map using a terrain classification code map and a stiffness to viscosity ratio map.

Figure 16:
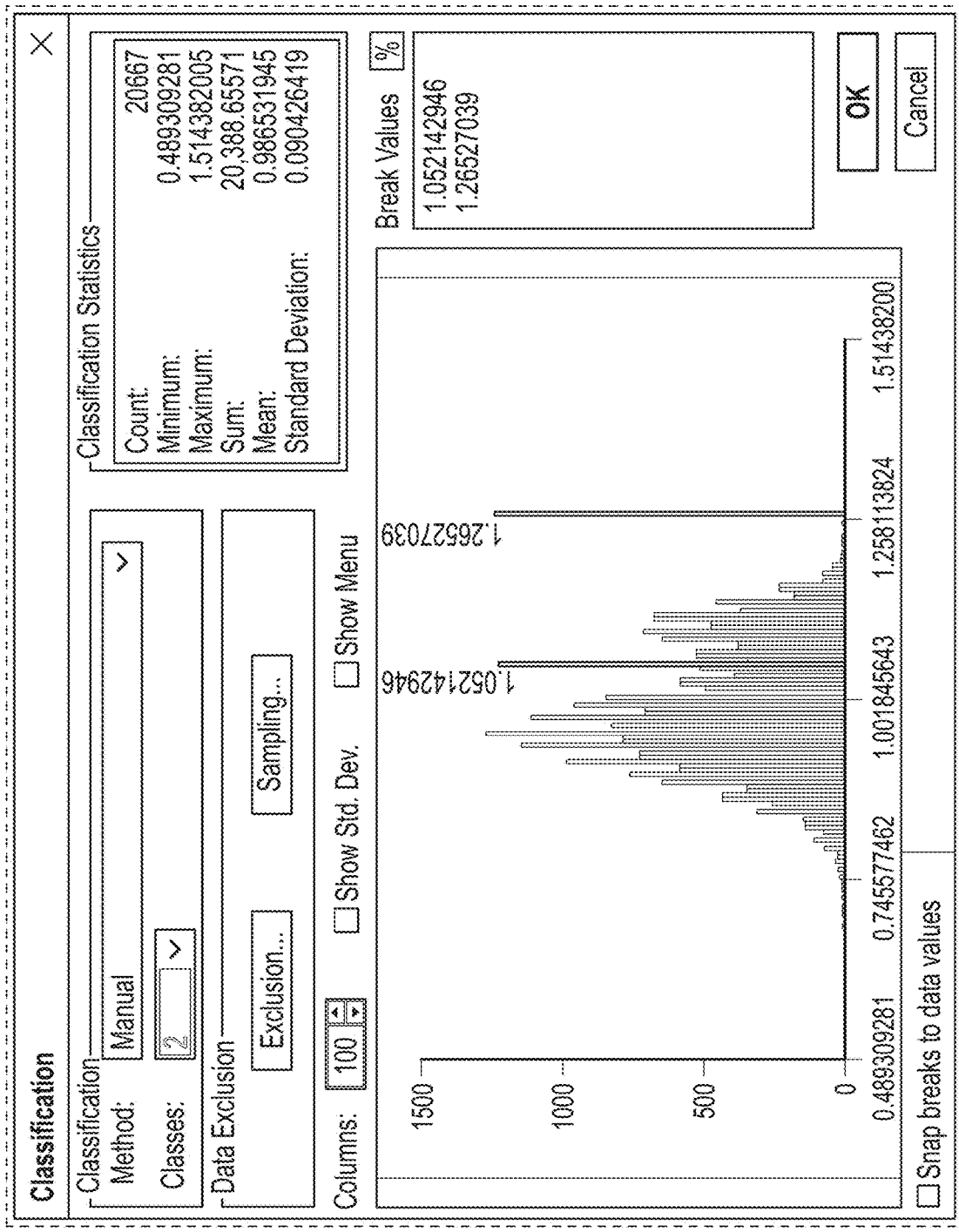
FIG. 16 illustrates an example interface for reclassifying a stiffness to viscosity ratio map using histogram.
Figure 19:
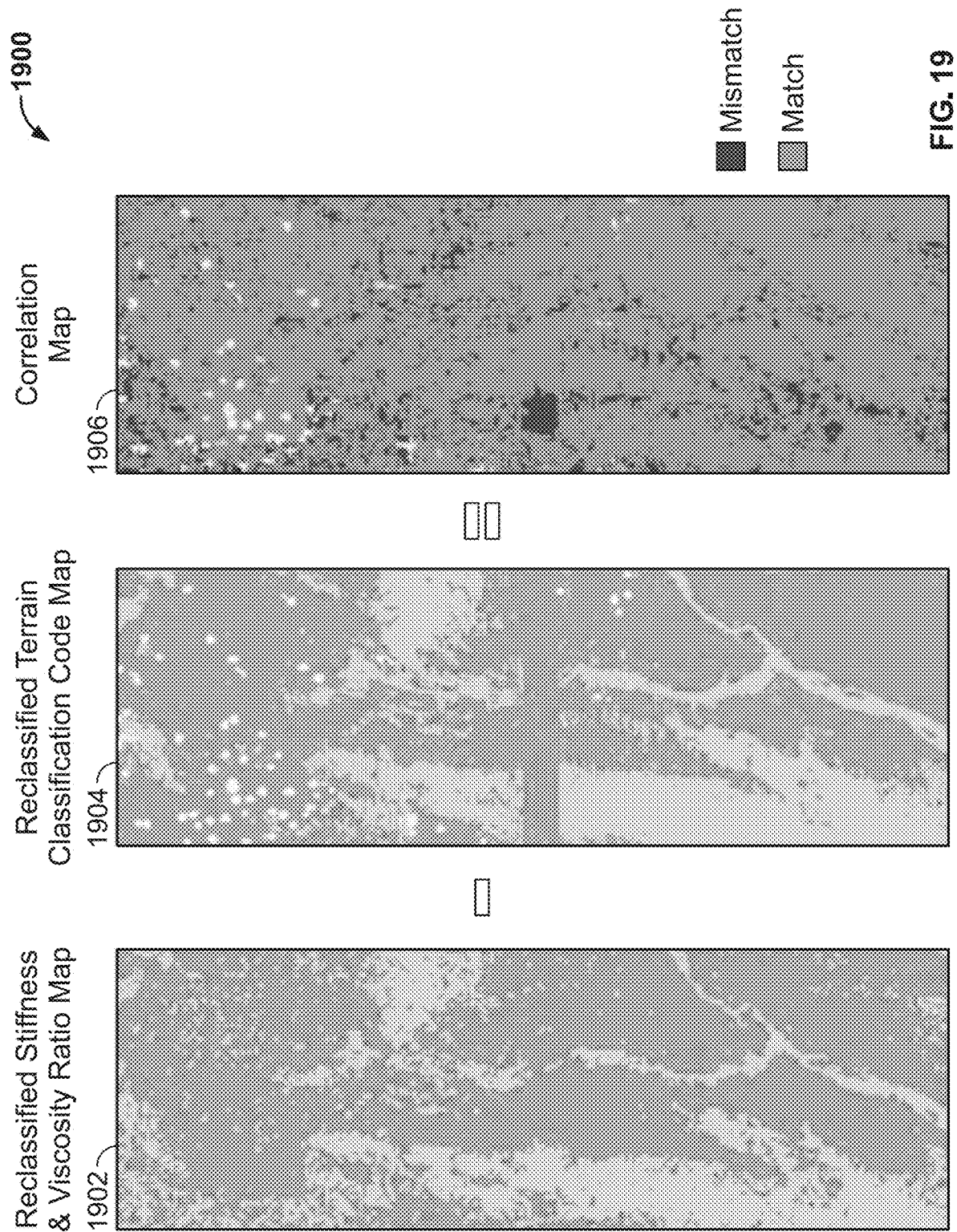
FIG. 19 illustrates an example process of generating a correlation map.

At 1502, the values in a stiffness to viscosity ratio map are reclassified to two types, for example, sand and gravel, using the histogram of the stiffness to viscosity ratio map. A histogram range can be assigned to sand and another histogram range can be assigned to gravel. In some implementations, a reclassification tool from a GIS service software, for example, ArcGIS", can be used to reclassify the values in the stiffness to viscosity ratio map to sand and gravel. An example interface 1600 for the reclassification process is shown in FIG. 16. A terrain classification code map can be used to determine the two break values shown in FIG. 16. First, values of stiffness and viscosity ratio map from several areas in the terrain classification code map are identified. Next the range of each terrain in histogram is adjusted until a match is reached between the reclassified terrain classification codes map and the reclassified stiffness & viscosity ratio map. An example of the reclassified terrain classification codes map and an example of the reclassified stiffness & viscosity ratio map are shown in FIG. 19. FIG. 17 illustrates an example comparison 1700 between a stiffness to viscosity ratio map 1702 and a reclassified stiffness to viscosity ratio map 1704.

Figure 18:
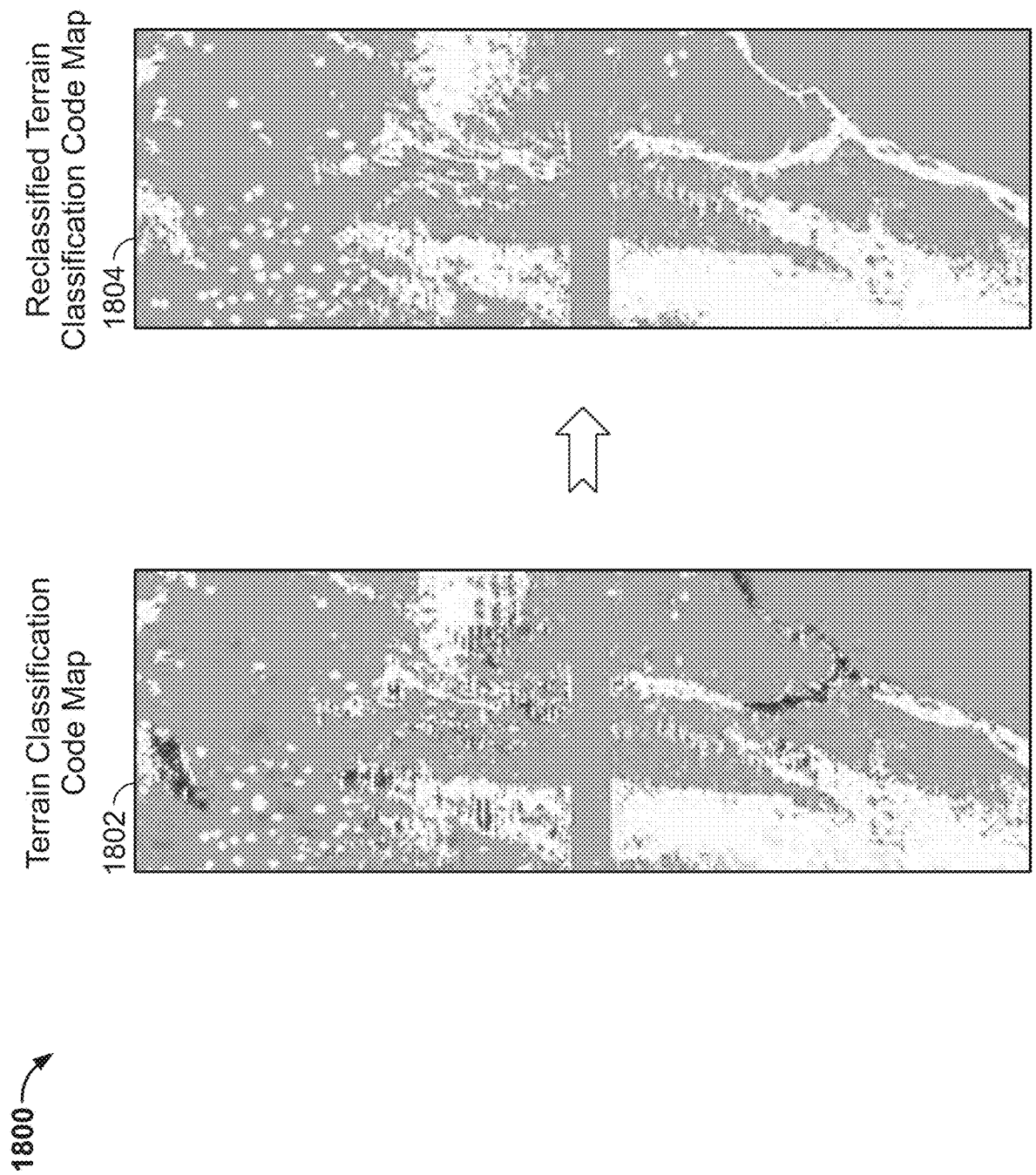
FIG. 18 illustrates an example comparison between a terrain classification code map 1802 and a reclassified and processed terrain classification code map.

At 1504, subtle changes within the terrains in the terrain classification code map are removed from the terrain classification code map, then the values in the updated terrain classification code map are reclassified to the two types of sand and gravel using the histogram of the terrain classification code map. The subtle changes correspond to one or more layers 2104 extracted from the terrain classification code map in FIG. 21. FIG. 18 illustrates an example comparison 1800 between a terrain classification code map 1802 and the map 1804 after both the removal of subtle changes and the reclassification.

At 1506, a correlation map is generated after the reclassified terrain classification code map generated at 1504 is subtracted from the reclassified stiffness to viscosity ratio map generated at 1502. FIG. 19 illustrates an example process 1900 of generating a correlation map 1906.

Figure 20:
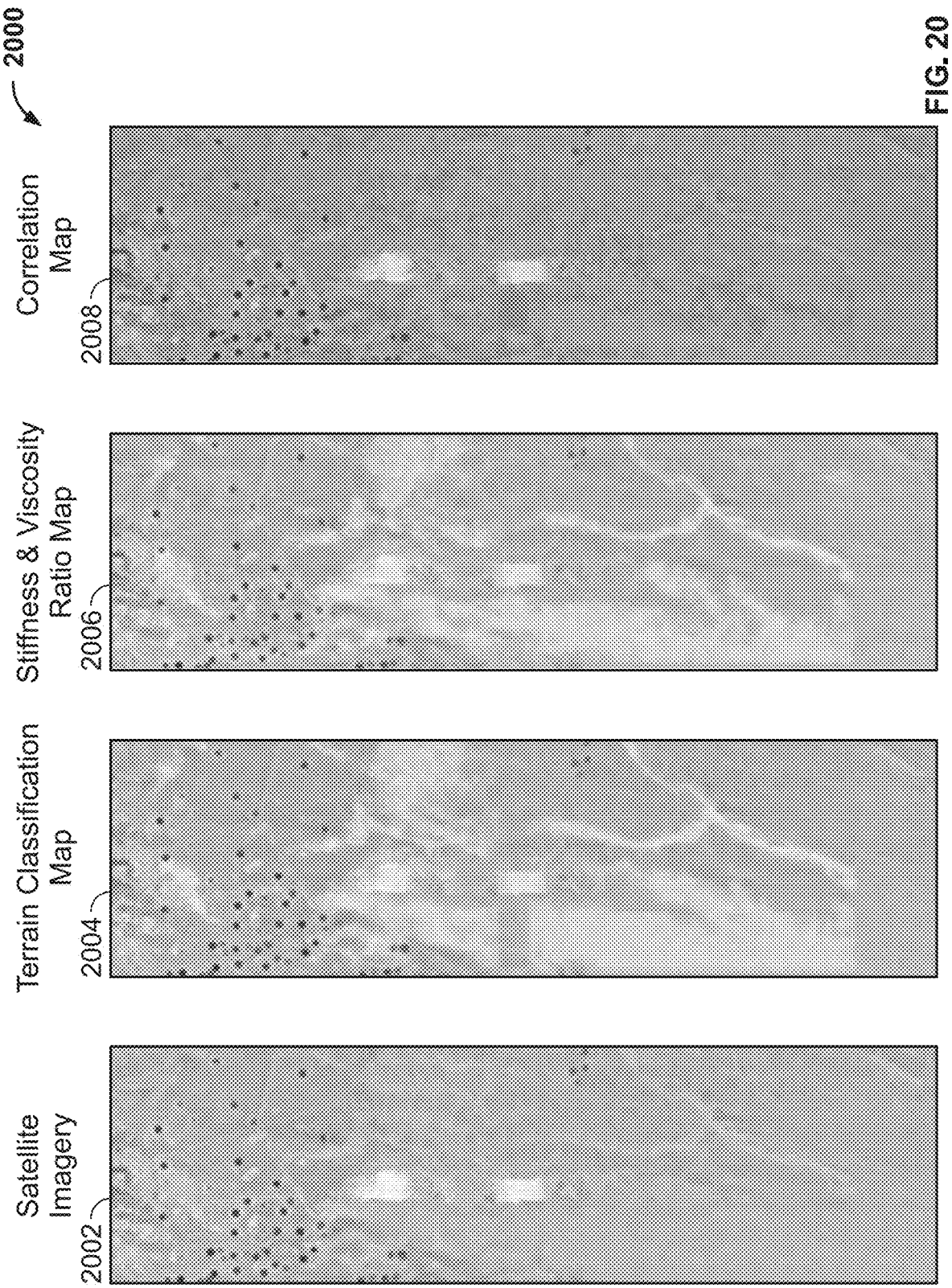
FIG. 20 illustrates example maps projected to a satellite imagery.

At 1508, the correlation map is projected to a satellite image of the seismic data acquisition area corresponding to the correlation map for inspection of visual discrepancy between terrain classification map 2004 and stiffness and viscosity ratio map 2006. FIG. 20 illustrates an example satellite imagery 2002 of a seismic data acquisition area, a map 2004 after a terrain classification code map projected to the satellite imagery, a map 2006 after a stiffness to viscosity ratio map is projected to the satellite imagery, and a map 2008 after the correlation map is projected to the satellite imagery. The correlation map projected to the satellite imagery can be used for inspection of visual discrepancy between terrain classification map 2004 and stiffness and viscosity ratio map 2006, and the inspection result can be reported to the owner of the terrain classification code map for review. For example, the circled area in terrain classification code map 2202 can be determined by the inspection to be a human input error.

FIG. 21 illustrates an example process 2100 for refining a terrain classification code map using a reclassified stiffness to viscosity ratio map 2102. The reclassified stiffness to viscosity ratio map 2102 can be generated, for example, using step 1502 in FIG. 15.

First, one or more layers 2104 in the terrain classification code map are extracted from the terrain classification code map, by removing the layers of sand and gravel from the terrain classification code map using a GIS service software such as ArcGIS™.

Next, the one or more extracted layers 2104 are added to the reclassified stiffness to viscosity ratio map 2102 to generate a refined terrain classification code map 2106.

FIG. 22 illustrates an example comparison 2200 between a terrain classification code map 2202 and its corresponding refined terrain classification code map 2204. The circled area in the terrain classification code map indicates gravel cutting through sand, which is an anomaly in the terrain classification code map. The corresponding circled area in the refined terrain classification code map indicates the sand is continuous. Therefore the refined terrain classification code map corrects the anomaly shown in the circled area of the original terrain classification code map.

FIG. 23 depicts an example method 2300 for refining a terrain classification code map using a stiffness to viscosity ratio map. For convenience, the method 2300 will be described as being performed by a system of one or more computers, located in one or more locations, and programmed appropriately in accordance with this specification.

At 2302, a computer system generates a respective ratio of measured ground stiffness to measured ground viscosity at each of multiple ground points, where each of the multiple ground points is a point where vibrations are generated in ground for seismic data acquisition, and the measured ground stiffness and the measured ground viscosity at each of the multiple ground points are obtained from a vibroseis system.

At 2304, the computer system generates a terrain classification code map, where the terrain classification code map comprises a respective terrain type for each of the multiple ground points.

At 2306, the computer system refines the terrain classification code map using the respective ratio of measured ground stiffness to measured ground viscosity at each of the multiple ground points.

Figure 24:
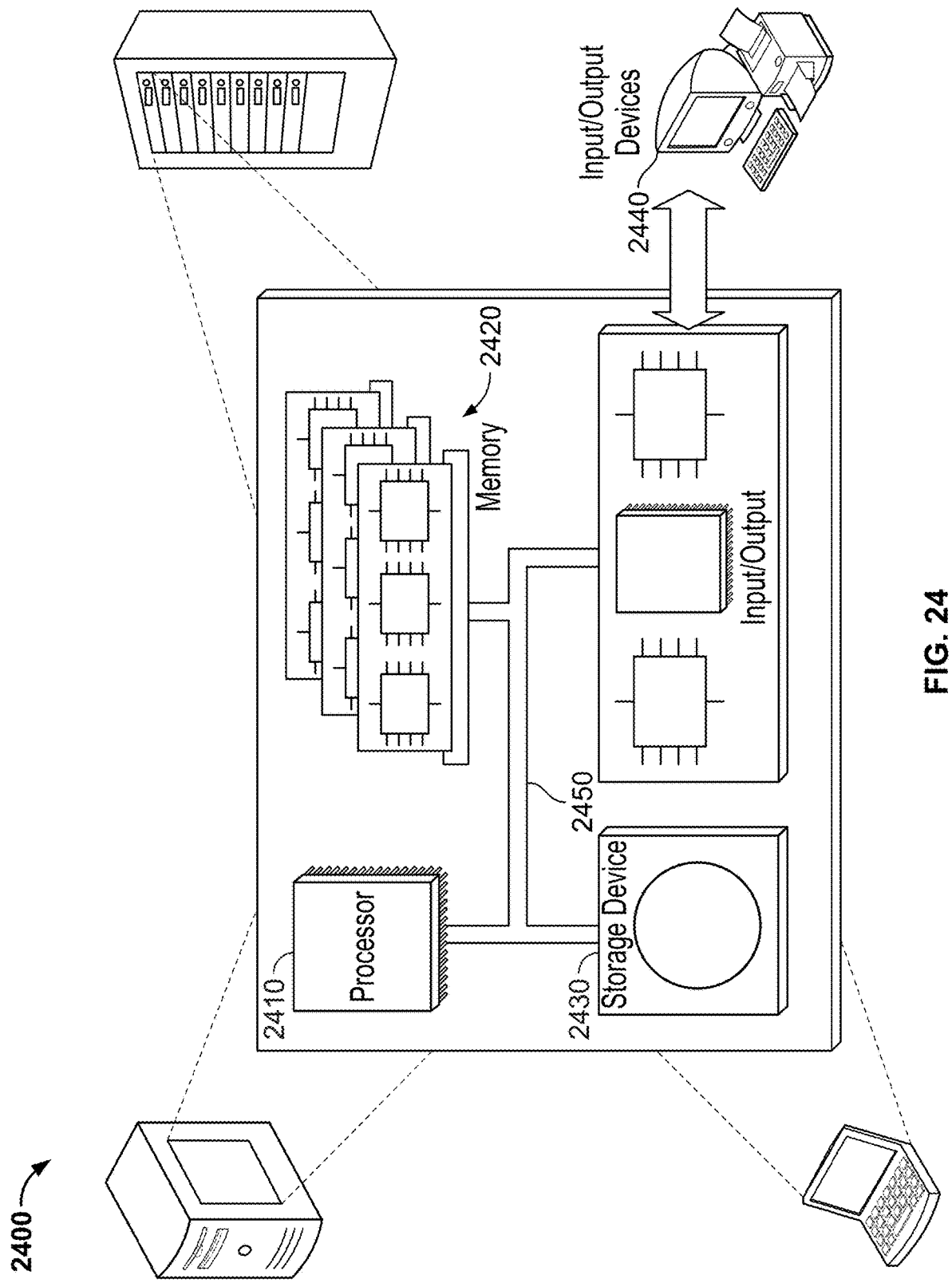
FIG. 24 is a schematic illustration of example computer systems that can be used to execute implementations of the present disclosure.

FIG. 24 illustrates a schematic diagram of an example computing system 2400. The system 2400 can be used for the operations described in association with the implementations described herein. For example, the system 2400 may be included in any or all of the server components discussed herein. The system 2400 includes a processor 2410, a memory 2420, a storage device 2430, and an input/output device 2440. The components 2410, 2420, 2430, and 2440 are interconnected using a system bus 2450. The processor 2410 is capable of processing instructions for execution within the system 2400. In some implementations, the processor 2410 is a single-threaded processor. The processor 2410 is a multi-threaded processor. The processor 2410 is capable of processing instructions stored in the memory 2420 or on the storage device 2430 to display graphical information for a user interface on the input/output device 2440.

The memory 2420 stores information within the system 2400. In some implementations, the memory 2420 is a computer-readable medium. The memory 2420 is a volatile memory unit. The memory 2420 is a non-volatile memory unit. The storage device 2430 is capable of providing mass storage for the system 2400. The storage device 2430 is a computer-readable medium. The storage device 2430 may be a floppy disk device, a hard disk device, an optical disk device, or a tape device. The input/output device 2440 provides input/output operations for the system 2400. The input/output device 2440 includes a keyboard and/or pointing device. The input/output device 2440 includes a display unit for displaying graphical user interfaces.

Certain aspects of the subject matter described here can be implemented as a method. A respective ratio of measured ground stiffness to measured ground viscosity is generated at each of multiple ground points, where each of the multiple ground points is a point where vibrations are generated in ground for seismic data acquisition, and the measured ground stiffness and the measured ground viscosity at each of the multiple ground points are obtained from a vibroseis system. A terrain classification code map is generated, where the terrain classification code map comprises a respective terrain type for each of the multiple ground points. The terrain classification code map is refined using the respective ratio of measured ground stiffness to measured ground viscosity at each of the multiple ground points.

An aspect taken alone or combinable with any other aspect includes the following features. Before generating the respective ratio of measured ground stiffness to measured ground viscosity at each of the multiple ground points, determining the measured ground stiffness and the measured ground viscosity at each of the multiple ground points using data collected during seismic data acquisition at each of the multiple ground points.

An aspect taken alone or combinable with any other aspect includes the following features. Refining the terrain classification code map using the respective ratio of measured ground stiffness to measured ground viscosity at each of the plurality of ground points includes generating a stiffness to viscosity ratio map using the respective ratio of measured ground stiffness to measured ground viscosity at each of the multiple ground points, reclassifying the respective ratio of measured ground stiffness to measured ground viscosity at each of the multiple ground points using histogram of the stiffness to viscosity ratio map, and refining the terrain classification code map using the reclassified respective ratio of measured ground stiffness to measured ground viscosity at each of the multiple ground points.

An aspect taken alone or combinable with any other aspect includes the following features. Refining the terrain classification code map using the respective ratio of measured ground stiffness to measured ground viscosity at each of the multiple ground points includes extracting one or more layers from the terrain classification code map, and refining the terrain classification code map by adding the reclassified respective ratio of measured ground stiffness to measured ground viscosity at each of the multiple ground points to the one or more layers extracted from the terrain classification code map.

An aspect taken alone or combinable with any other aspect includes the following features. Refining the terrain classification code map using the respective ratio of measured ground stiffness to measured ground viscosity at each of the multiple ground points includes generating a stiffness to viscosity ratio map using the respective ratio of measured ground stiffness to measured ground viscosity at each of the multiple ground points, generating a correlation map using the terrain classification code map and the stiffness to viscosity ratio map, determining, using the correlation map, that there is at least one ground point with incorrect terrain type in the terrain classification code map, and in response to determining that there is at least one ground point with incorrect terrain type in the terrain classification code map, refining the terrain classification code map using the respective ratio of measured ground stiffness to measured ground viscosity at each of the multiple ground points.

An aspect taken alone or combinable with any other aspect includes the following features. Reclassifying the respective ratio of measured ground stiffness to measured ground viscosity at each of the multiple ground points using the histogram of the stiffness to viscosity ratio map includes assigning a respective range of values in the histogram of the stiffness to viscosity ratio map to each terrain type in the terrain classification code map.

An aspect taken alone or combinable with any other aspect includes the following features. Extracting the one or more layers from the terrain classification code map includes removing a layer of sand and a layer of gravel from the terrain classification code map using a geographic information system (GIS) service software.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
generating, using a vibroseis system, a controlled wavetrain through vibrations applied by a vibrator to a base plate at a plurality of ground points;
measuring, using the vibroseis system, a ground stiffness and a ground viscosity at each of the plurality of ground points;
generating a respective ratio of the ground stiffness to the ground viscosity at each of the plurality of ground points, wherein each of the plurality of ground points is a point where vibrations are generated in ground for seismic data acquisition;
generating a terrain classification code map, wherein the terrain classification code map comprises a respective terrain type for each of the plurality of ground points; and
refining the terrain classification code map using the respective ratio of measured the ground stiffness to measured the ground viscosity at each of the plurality of ground points to improve terrain classification accuracy, wherein refining the terrain classification code map comprises:

generating a stiffness to viscosity ratio map using the respective ratio of the ground stiffness to the ground viscosity at each of the plurality of ground points;

reclassifying, as a reclassified respective ratio, the respective ratio of the ground stiffness to the ground viscosity at each of the plurality of ground points using a histogram of the stiffness to viscosity ratio map; and refining the terrain classification code map using the reclassified respective ratio of the ground stiffness to the ground viscosity at each of the plurality of ground points.

2. The computer-implemented method of claim 1, wherein before generating the respective ratio of the ground stiffness to the ground viscosity at each of the plurality of ground points, the method further comprises:

determining the ground stiffness and the ground viscosity at each of the plurality of ground points using data collected during seismic data acquisition at each of the plurality of ground points.

3. The computer-implemented method of claim 1, wherein refining the terrain classification code map using the respective ratio of the ground stiffness to the ground viscosity at each of the plurality of ground points comprises:

extracting one or more layers from the terrain classification code map; and refining the terrain classification code map by adding the reclassified respective ratio of the ground stiffness to the ground viscosity at each of the plurality of ground points to the one or more layers extracted from the terrain classification code map.

4. The computer-implemented method of claim 3, wherein extracting the one or more layers from the terrain classification code map comprises removing a layer of sand and a layer of gravel from the terrain classification code map using a geographic information system (GIS) service software.

5. The computer-implemented method of claim 1, wherein refining the terrain classification code map using the respective ratio of the ground stiffness to the ground viscosity at each of the plurality of ground points further comprises:

generating a correlation map using the terrain classification code map and the stiffness to viscosity ratio map;

determining, using the correlation map, that there is at least one ground point with incorrect terrain type in the terrain classification code map; and in response to determining that there is at least one ground point with incorrect terrain type in the terrain classification code map, refining the terrain classification code map using the respective ratio of the ground stiffness to the ground viscosity at each of the plurality of ground points.

6. The computer-implemented method of claim 1, wherein reclassifying the respective ratio of the ground stiffness to the ground viscosity at each of the plurality of ground points using the histogram of the stiffness to viscosity ratio map comprises assigning a respective range of values in the histogram of the stiffness to viscosity ratio map to each terrain type in the terrain classification code map.

7. A non-transitory, computer-readable medium storing one or more instructions executable by a computer system to perform operations comprising:

generating, using a vibroseis system, a controlled wavetrain through vibrations applied by a vibrator to a base plate at a plurality of ground points;

causing measurement of, using the vibroseis system, a ground stiffness and a ground viscosity at each of the plurality of ground points;

generating a respective ratio of the ground stiffness to the ground viscosity at each of the plurality of ground points, wherein each of the plurality of ground points is a point where vibrations are generated in ground for seismic data acquisition;

generating a terrain classification code map, wherein the terrain classification code map comprises a respective terrain type for each of the plurality of ground points; and refining the terrain classification code map using the respective ratio of the ground stiffness to the ground viscosity at each of the plurality of ground points to improve terrain classification accuracy, wherein refining the terrain classification code map comprises:

generating a stiffness to viscosity ratio map using the respective ratio of the ground stiffness to the ground viscosity at each of the plurality of ground points;

reclassifying, as a reclassified respective ratio, the respective ratio of the ground stiffness to measured the ground viscosity at each of the plurality of ground points using a histogram of the stiffness to viscosity ratio map; and refining the terrain classification code map using the reclassified respective ratio of the ground stiffness to the ground viscosity at each of the plurality of ground points.

8. The non-transitory, computer-readable medium of claim 7, wherein before generating the respective ratio of the ground stiffness to the ground viscosity at each of the plurality of ground points, the operations further comprise:

determining the ground stiffness and the ground viscosity at each of the plurality of ground points using data collected during seismic data acquisition at each of the plurality of ground points.

9. The non-transitory, computer-readable medium of claim 7, wherein refining the terrain classification code map using the respective ratio of the ground stiffness to the ground viscosity at each of the plurality of ground points comprises:

extracting one or more layers from the terrain classification code map; and refining the terrain classification code map by adding the reclassified respective ratio of the ground stiffness to the ground viscosity at each of the plurality of ground points to the one or more layers extracted from the terrain classification code map.

10. The non-transitory, computer-readable medium of claim 9, wherein extracting the one or more layers from the terrain classification code map comprises removing a layer of sand and a layer of gravel from the terrain classification code map using a geographic information system (GIS) service software.

11. The non-transitory, computer-readable medium of claim 7, wherein refining the terrain classification code map using the respective ratio of the ground stiffness to the ground viscosity at each of the plurality of ground points further comprises:

generating a correlation map using the terrain classification code map and the stiffness to viscosity ratio map;

determining, using the correlation map, that there is at least one ground point with incorrect terrain type in the terrain classification code map; and in response to determining that there is at least one ground point with incorrect terrain type in the terrain classification code map, refining the terrain classification code map using the respective ratio of the ground stiffness to the ground viscosity at each of the plurality of ground points.

12. The non-transitory, computer-readable medium of claim 7, wherein reclassifying the respective ratio of the ground stiffness to the ground viscosity at each of the plurality of ground points using the histogram of the stiffness to viscosity ratio map comprises assigning a respective range of values in the histogram of the stiffness to viscosity ratio map to each terrain type in the terrain classification code map.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, using a vibroseis system, a controlled wavetrain through vibrations applied by a vibrator to a base plate at a plurality of ground points;
causing measurement of, using the vibroseis system, a ground stiffness and a ground viscosity at each of the plurality of ground points;
generating a respective ratio of the ground stiffness to the ground viscosity at each of the plurality of ground points, wherein each of the plurality of ground points is a point where vibrations are generated in ground for seismic data acquisition;
generating a terrain classification code map, wherein the terrain classification code map comprises a respective terrain type for each of the plurality of ground points; and
refining the terrain classification code map using the respective ratio of the ground stiffness to the ground viscosity at each of the plurality of ground points to improve terrain classification accuracy, wherein refining the terrain classification code map comprises:
generating a stiffness to viscosity ratio map using the respective ratio of the ground stiffness to the ground viscosity at each of the plurality of ground points;
reclassifying, as a reclassified respective ratio, the respective ratio of the ground stiffness to the ground viscosity at each of the plurality of ground points using a histogram of the stiffness to viscosity ratio map; and refining the terrain classification code map using the reclassified respective ratio of the ground stiffness to the ground viscosity at each of the plurality of ground.

14. The computer-implemented system of claim 13, wherein before generating the respective ratio of the ground stiffness to the ground viscosity at each of the plurality of ground points, the one or more operations further comprise:
determining the ground stiffness and the ground viscosity at each of the plurality of ground points using data collected during seismic data acquisition at each of the plurality of ground points.

15. The computer-implemented system of claim 13, wherein refining the terrain classification code map using the respective ratio of the ground stiffness to the ground viscosity at each of the plurality of ground points comprises:
extracting one or more layers from the terrain classification code map; and
refining the terrain classification code map by adding the reclassified respective ratio of the ground stiffness to the ground viscosity at each of the plurality of ground points to the one or more layers extracted from the terrain classification code map.

16. The computer-implemented system of claim 13, wherein refining the terrain classification code map using the respective ratio of the ground stiffness to the ground viscosity at each of the plurality of ground points further comprises:
generating a correlation map using the terrain classification code map and the stiffness to viscosity ratio map;
determining, using the correlation map, that there is at least one ground point with incorrect terrain type in the terrain classification code map; and
in response to determining that there is at least one ground point with incorrect terrain type in the terrain classification code map, refining the terrain classification code map using the respective ratio of the ground stiffness to the ground viscosity at each of the plurality of ground points.

17. The computer-implemented system of claim 13, wherein reclassifying the respective ratio of the ground stiffness to the ground viscosity at each of the plurality of ground points using the histogram of the stiffness to viscosity ratio map comprises assigning a respective range of values in the histogram of the stiffness to viscosity ratio map to each terrain type in the terrain classification code map.

* * * * *